Dec. 27, 1966 J. M. MALJANIAN 3,293,858
FLOW DIVISION APPARATUS FOR FUEL SUPPLY SYSTEM
Filed Feb. 4, 1965 3 Sheets-Sheet 1

INVENTOR
JOHN M. MALJANIAN
BY
ATTORNEY

Dec. 27, 1966       J. M. MALJANIAN       3,293,858
FLOW DIVISION APPARATUS FOR FUEL SUPPLY SYSTEM
Filed Feb. 4, 1965                    3 Sheets-Sheet 3

FIG.3

INVENTOR
JOHN M. MALJANIAN
BY *(signature)*
ATTORNEY

United States Patent Office 3,293,858
Patented Dec. 27, 1966

1

3,293,858
FLOW DIVISION APPARATUS FOR FUEL
SUPPLY SYSTEM
John M. Maljanian, Newington, Conn., assignor to
Chandler Evans, Inc., West Hartford, Conn., a corporation of Delaware
Filed Feb. 4, 1965, Ser. No. 430,261
7 Claims. (Cl. 60—241)

This invention relates to improvements in mechanisms for control of flow of fuel to a combustion zone and, more particularly, to a flow division arrangement that will supply fuel to a plurality of flow distribution manifolds in accordance with an operating procedure that will maintain the nozzle pressure at a preselected optimum value with maximum variations in fuel flow.

The efficient operation of internal combustion engines, in particular gas turbine engines, requires good fuel atomization for good combustion. The atomization of fuel is usually obtained by means of a high pressure drop across the nozzle at the point of the injection of the fuel into the combustion chamber. The large fuel flow range required for satisfactory operation of most of these engines, and particularly the afterburning section of gas turbine engines, prevents the use of a single nozzle due to the extremely high pressure range that would be necessary to cover the range of fuel flows. Hence, the fuel distribution system of the afterburning section of gas turbine engines employs a fuel division system to mitigate the large range of nozzle pressure required. This fuel division system at some preselected value of pressure divides the control-scheduled fuel flow into a primary and a secondary system whereby a larger nozzle area is utilized, thus reducing the high-pressure range required to deliver the maximum fuel flow.

The conventional schemes of flow dividers use the upstream nozzle pressure of the primary pressurizing system as the actuating pressure to trigger flow division. A pressure sensitive valve is connected intermediate the primary conduit and a parallel secondary conduit such that when a predetermined upstream primary nozzle pressure is reached the pressure sensitive valve admits flow into the secondary conduit, thus providing parallel flow paths for the fuel flow supply to the primary conduit. This scheme requires a relatively high nozzle operating pressure range over a large flow range since the primary nozzle upstream pressure is maintained at a nearly constant value during the flow division process. Thus, as the fuel flow to the primary conduit increases, the primary nozzle system pressure level rises slightly during the flow division process until the pressure sensitive valve is completely open and exposes the full secondary conduit flow area. The increases in system pressure from the point of initiation of flow division until the secondary parallel flow system is completely operable represent a pressure increase that it is desirable to eliminate. It is an object of the present invention to provide an improved flow division apparatus for a turbine engine afterburner flow control system that will provide the desired pressure drop across the nozzles necessary for the proper admission of fuel at minimum flow and will minimize change in this pre-established nozzle pressure drop after a large increase in fuel flow.

A further object of this invention is to provide an improved flow division apparatus in which the flow division will be initiated by an independent triggering function rather than the nozzle pressure level of the primary nozzle system.

A still further object of this invention is to provide an improved flow division apparatus in which an intermediate flow will permit the filling of the secondary manifold and distribution system at a preselected intermediate flow rate prior to injection of maximum secondary flow to prevent flameout due to sudden reduction in the primary flow when secondary flow is initiated.

These and other objects of the invention will become readily apparent from the following description and claims taken in connection with the accompanying drawings forming a part of this application in which:

FIGURE 3 is a schematic illustration of the flow division apparatus which is a preferred form of the invention.

Figure 1:
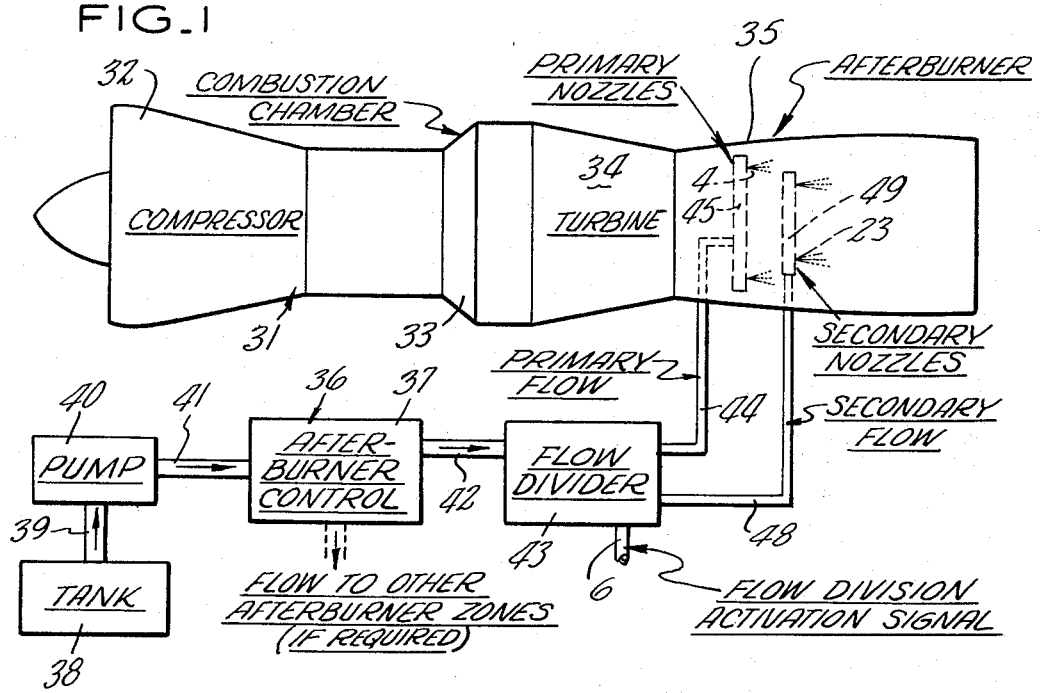
FIGURE 1 is a schematic illustration of a turbojet engine having an afterburner and equipped with an afterburner fuel control apparatus comprising a flow division device.

Referring to FIGURE 1 of the drawings, the gas turbine power plant shown therein comprises a turbojet engine generally indicated at 31. This turbojet engine 31 includes a compressor 32, a combustion chamber 33, a turbine section 34, and an afterburner 35. The afterburner 35 has fuel fed to it by an afterburner control apparatus generally indicated at 36.

The afterburner control apparatus 36 has an afterburner control 37 which is fed fuel from a fuel supply 38 through conduit 39 into pump 40. Pump 40 supplies pressurized fuel through conduit 41 to afterburner fuel control 37. The afterburner fuel control 37 supplies fuel via a conduit 42 to flow divider 43 and thence through conduit 44 into primary manifold 45 where the pressurized fuel is injected by means of primary nozzles 4 into the afterburner combustion chamber. The primary nozzles 4 are fed directly from afterburner control 37 via conduit 42, flow divider 43, conduit 44 and primary manifold 45. Upon receipt of a flow division actuation signal through a signal conduction means 6 into flow divider 43 the fluid flow of conduit 42 will be divided into primary conduit 44 and secondary conduit 48. The secondary fuel flow will be conducted through conduit 48 and secondary nozzles 23 into the combustion chamber of afterburner 35.

The flow divider 43 is schematically illustrated in FIGURE 3. The flow divider 43 contains a primary flow system wherein flow from the afterburner control 37 enters the primary flow system through conduit 42 at point 1, proceeds past wash flow filter 2 through conduit 3 to conduit 44 and thence to primary nozzles 4 via primary manifold 45. According to the invention it is to be understood that fuel is supplied directly to the afterburner through conduit 42, entrance point 1, conduit 44, primary manifold 45 and primary nozzles 4 when activation of the afterburner fuel control system 36 is instituted. The portion of the afterburner fuel flow curve shown in FIGURE 2 as the solid line portion from the origin to the point A represents the primary afterburner fuel control operation.

Flow division is initiated in response to a pressure signal introduced into conduit 6 of the switchover device shown generally at 5 in FIGURE 3. Lever 7 is fixedly, pivotably mounted intermediate its ends to the housing 8 of switchover device 5. One end of lever 9 is also fixedly, pivotably mounted to the housing 8. The end of lever 9, not pivotably mounted to housing 8, is attached to spring 10. One end of lever 7 is attached to the end of spring 10 not attached to lever 9. The force produced by spring 10 in its non-triggered position urges lever 9 in contact with valve seat 46 such that the flow of fluid through conduit 12 and fixed restriction 11 into cavity 13 is blocked. The end of lever 7 not attached to spring 10 contacts bellows 14 such that expansion of bellows 14 resulting from a pressure increase introduced into bellows 14 through conduit 6 will cause lever 7 to move in a counterclockwise direction about its pivot 47. This counterclockwise movement of lever 7 is such that spring 10 will rotate in a counterclockwise direction about the right hand end of lever 9 sufficiently to move the spring force of spring 10 over the centerline of lever 9 and thus cause lever 9 to rotate in a clockwise direction about its pivot 50 with a snap action of lever 9 opening valve 46.

When the action of lever 9 opens valve 46, this action connects cavity 13 to chamber 51 by means of connecting conduit 12. Check valve 52 contained in chamber 51 is urged in sealing engagement with the face of cavity 51 by spring 52. Chamber 53 is maintained in fluid engagement with primary fluid conduit 3 by means of annulus 54 and interconnecting fluid conduits 55, 15 and 26. The fluid pressure in chamber 53 is such that when valve 46 is open, the pressure on the face of check valve 52 exposed to chamber 52 is sufficient to overcome the force of spring 56 and thus move check valve 52 from sealing engagement with chamber 53 and thereby permit the fluid to flow from chamber 53 into chamber 51. Fluid will then flow from chamber 51 through conduit 12 and restriction 11 into cavity 13.

Start valve 16 is connected in fluid engagement with primary fluid flow contact 3 such that primary fluid flow acts on one face of start valve 16 by means of conduit 17. The opposite face of valve 16 is in fluid engagement with primary conduit 3 by means of annulus 54 and interconnecting fluid conduits 55 and 15 and chamber 57. This arrangement is such that the opposite faces of start valve 16 are exposed to the same pressure level when valve 46 is closed. The area of the valve 16 communicative with fluid passage 17 being smaller than the opposite face exposed to chamber 57, the spring force of spring 58 urges valve 16 into sealing engagement with valve seat 18. Thus, the combined force of spring 58 and the area of valve 16 exposed to the fluid pressure in chamber 57 being greater than the force on the face of valve 16 exposed to the fluid pressure of chamber 17, valve 16 will be held in engagement with valve seat 18 when valve 46 is closed.

When the action of triggering mechanism 5 is such as to open valve 46 and permit fluid to flow from conduit 55 through connecting conduits 15, 26, 53, 51 and 12 into cavity 13, the pressure in chamber 57 will be less than the pressure in conduit 17 by virtue of the pressure reduction intermediate series restrictions 30 and 11. This reduction of pressure in chamber 57 will cause start valve 16 to be forced off valve seat 18, thus permitting secondary flow to enter conduit 19. The secondary flow of conduit 19 will proceed through passage 59 and orifice 20 into secondary discharge conduit 21. The secondary maximum intermediate flow is established by the preselected flow that will pass through orifice 20. Sizing of orifice 20 determines the maximum preselected intermediate flow into secondary discharge conduit 21. The pressure drop across secondary nozzle 23 sensed by means of the difference in the upstream pressure communicated by conduit 21 and the tailpipe pressure communicated by conduit 24 establishes the point of transition to full secondary nozzle flow. Valve 22 is normally held in engagement against valve seat 60 by the action of spring 25 urging valve 22 in sealing engagement with valve seat 60. Spring 61 urges valves 22 in a direction opposite to that of spring 25. The magnitude of the force of spring 61 is less than that of spring 25, thus valve 22 will remain in sealing engagement with valve seat 60 during the start of secondary flow operation. The upstream pressure of nozzle 23 is communicated to chamber 28 and the inboard side of bulkhead 27 by means of conduit 62. The tailpipe pressure is communicated to chamber 29 and the outboard side of bulkhead 27 by means of conduit 24. Once maximum preset intermediate flow of secondary nozzle 23 has been reached, the pressure differential across bulkhead 27, established by the upstream pressure in cavity 28 and the downstream pressure in cavity 29 will cause spring 25 to be compressed, thus moving valve 22 to its full open position and communicating the full secondary flow in conduit 21 in parallel with the full primary flow in conduit 23 by means of connecting conduits 17 and 19.

In brief, the flow division apparatus just described effects division of a regulated fuel flow in accordance with an initiating or triggering signal such that a maximum preselected intermediate secondary flow will not be exceeded until the secondary flow distribution and manifold system has been filled to a preselected flow rate, this sequence of flow division being incorporated to preclude a drop in primary flow sufficient to cause burner blow-out of the combustion process in the after-burner combustion chamber.

OPERATION

The operation of the flow division process is initiated by a pressure signal received via conduit 6 into bellows 14. In the embodiment shown, the pressure signal communicated via conduit 6 is compressor discharge pressure. This compressor discharge pressure is communicated via conduit 6 to bellows 14 which is opposed by evacuated bellows 63 so that a resultant absolute pressure signal is obtained. The resultant expansion of bellows 14 moves lever 7 in a counterclockwise direction about pivot 47 such that the spring force of spring 10 interconnecting lever 7 and lever 9 is moved over the center line of lever 9, thus causing lever 9 to pivot about pivot 50 and to snap lever 9 to an open position and thus open valve 46. It is to be understood that the action of bellows 14 and 63 is merely illustrative of one embodiment and any form of device to actuate lever 7 may be substituted for the bellows assembly.

When valve 46 is open, fluid will be caused to flow through interconnecting conduits 55, 26, 53, 51 and 12 such that by virtue of the series restrictions 30 and 11 pressure in conduit 15 and its interconnecting chamber 57 will be reduced below the pressure in conduit 17. This action will start the division of secondary flow. This position is shown as Point A on the primary fuel flow curve of FIGURE 2. The primary pressure of conduit 17 being greater than the reduced pressure of chamber 57 will force valve 16 off seat 18, thus permitting secondary flow to enter conduit 19 and passage 59 and flow through restrictive orifice 20. The secondary maximum intermediate flow is established by the preselected flow that will pass through orifice 20. This condition is shown by the line proceeding from Point A to Point B on FIGURE 2. The preselected intermediate maximum flow rate is the vertical line represented by the line from Point B to the intersection of the primary flow line as shown in FIGURE 2.

Once the maximum preset intermediate flow of secondary nozzle 23 has been reached, valve 22 will move to its full open position and communicate the full secondary flow in conduit 21 in parallel with the full primary flow in conduit 3. This operation is shown by the line starting at Point B and proceeding to Point C on the total flow line as shown in FIGURE 2. Once Point C on the total flow line has been reached flow division operation is complete and any increase in fuel flow will proceed along the total fuel flow line shown on FIGURE 2. It will be noted that the instigation or activation of the flow division process can be started at any pressure level between Point A and Point G on the primary fuel flow line shown in FIGURE 2. The shaded area contained within the envelope established by Point A and Point G is the triggering flow range within which the primary to two-zone flow can be initiated. For example, it may be desired to initiate flow division at Point D instead of Point A as shown in FIGURE 2. If the flow division is initiated at Point D, intermediate secondary flow will prevail until Point E has been reached, at which time full secondary flow will be initiated and the pressure drop will proceed from Point E to Point F. It is to be noted that the preselected intermediate maximum flow rate, which is the vertical distance from Point E to the intersection with the primary flow line as shown on FIGURE 2, is exactly the same as for the condition when flow division is initiated at Point A.

Figure 4:
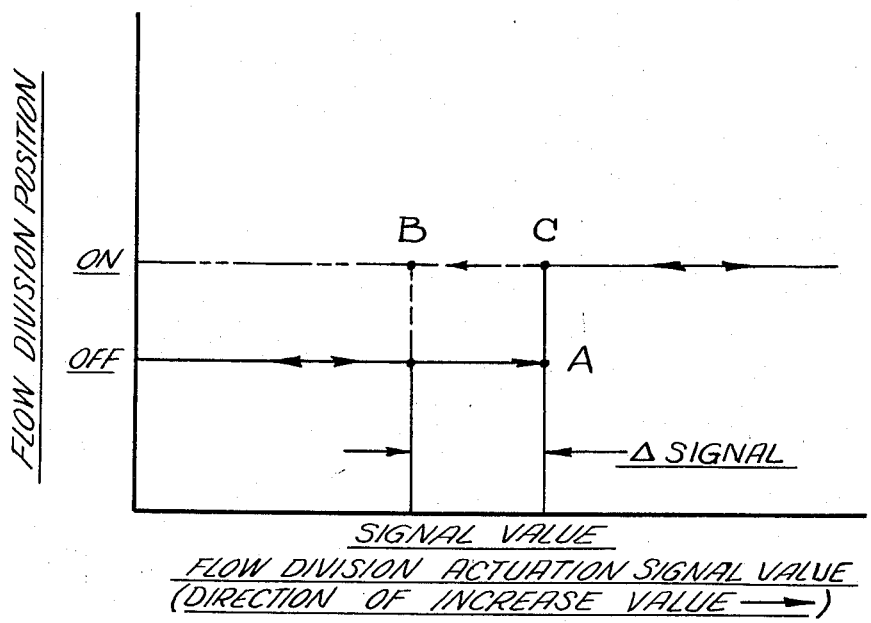
FIGURE 4 is a graphic illustration of the hysteresis characteristics of the flow division initiating apparatus.

The flow division triggering mechanism shown generally at 5 is so constructed that an increase in pressure in bellows 14 will cause the linkage mechanism 7 and 9 and interconnecting spring 10 to be moved in a snap action so as to open valve 46 and thus initiate the flow division process. This flow division point is shown as Point A on FIGURE 4. When the snap action occurs the linkage mechanism of triggering device 5 moves from Point A to Point C. Upon an increase in the triggering signal, such as an increase of pressure in bellows 14, the signal will proceed horizontally to the right from Point C of FIGURE 4, resulting in no further action of the triggering mechanism. When the triggering signal is reduced the action will proceed to the left past Point C to Point B of FIGURE 4, at which time the triggering device will snap shut, thus blocking the valve 46 and terminating the flow division process. It will be noted that there is a finite difference in the magnitude of the signal levels from Point C to Point B, as shown in FIGURE 4. This signal difference or hysteresis is built into the triggering mechanism to provide control stability, by preventing cycling of the flow divider from Point A to Point C, as shown on FIGURE 4, for small variations in the magnitude of the triggering signal about the threshold value.

Figure 2:
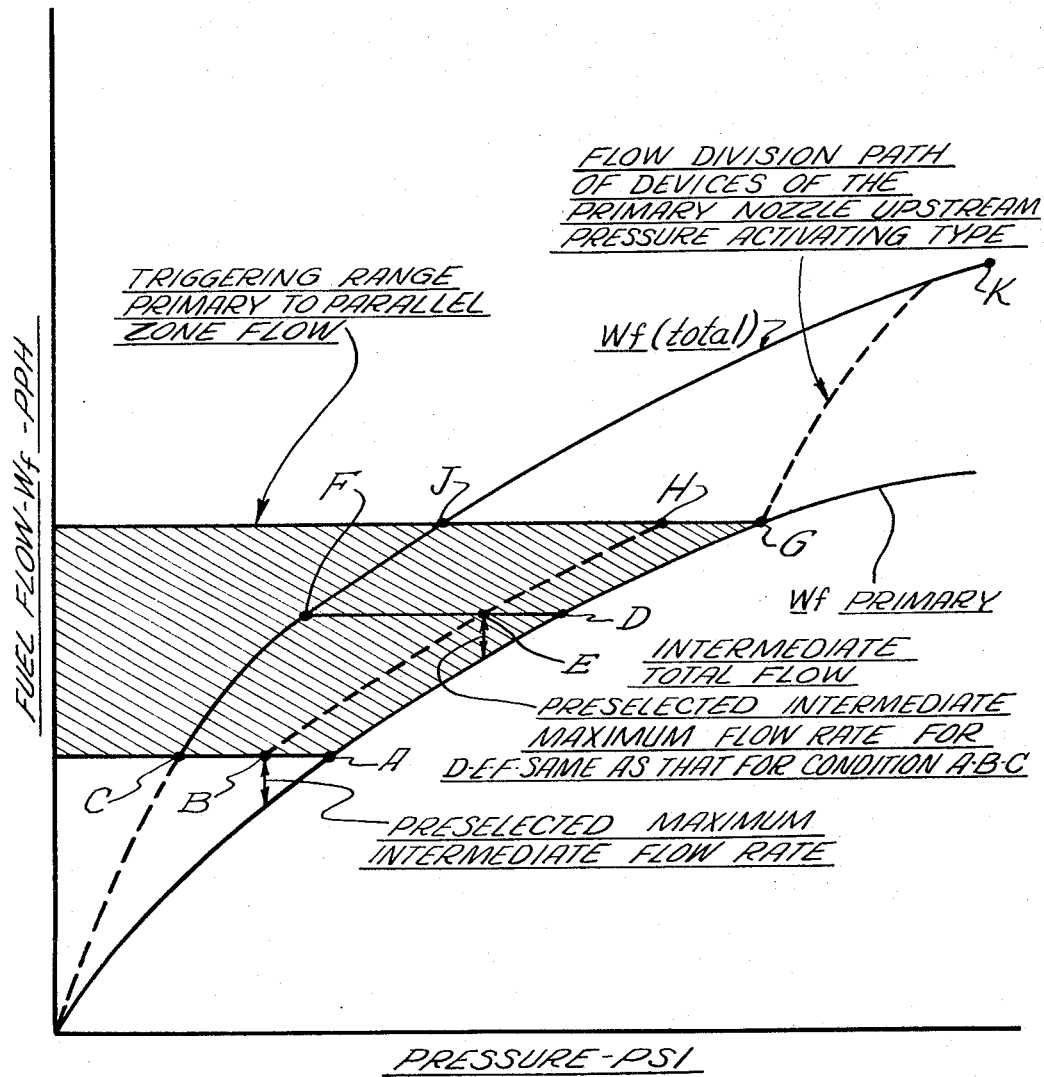
FIGURE 2 is a graphic illustration of the operational flow curves of flow division apparatus constructed in accordance with a preferred form of the invention.

To illustrate the conditions that may be encountered in such a flow divider as herein contemplated, in FIGURE 2 the projection to the ordinate of the line connecting Points A, B and C will indicate a fuel flow of approximately 5100 pounds per hour, a similar projection of Points G, H and J would indicate a fuel flow of approximately 9000 pounds per hour. The pressure at Point A would be 260 p.s.i., the pressure at Point B would be 160 p.s.i., and the pressure at Point C would be 100 p.s.i. The pressure at Point G would be 800 p.s.i., the pressure at Point H would be 640 p.s.i., and the pressure at Point J would be 320 p.s.i. The maximum fuel flow, represented by Point K, would be approximately 15,000 pounds per hour.

Although only one embodiment of this invention has been illustrated and described herein, it will become apparent that various changes and modifications may be made in the construction and arrangement of the various parts without departing from the scope of this novel concept. I, therefore, do not wish to be limited to the precise details set forth but desire to avail myself of such changes as fall within the purview of my invention.

What I claim is:

1. In a turbine engine afterburner control fluid flow division apparatus comprising, in combination, a source of regulated fluid flow, a plurality of fluid passages, said source connected to a first of said fluid passages, signal actuated triggering means responsive to an engine operating parameter, means responsive to said triggering means for diverting a portion of said regulated fluid flow from said first passage to a second of said passages, discharge flow rate measuring means, regulating means placed in flow series with and downstream of said diverting means, said regulating means being responsive to the magnitude of the discharge flow from said second passage limiting the flow through said second fluid passage only until a preselected flow level through said second fluid passage has been reached.

2. Fluid flow division apparatus as claimed in claim 1, including signal actuated triggering means comprising a third fluid passage having a fluid inlet from said first fluid passage and terminating in a fluid flow interrupting snap action switch device triggered by an engine parameter indicative signal, two flow restrictions positioned in said switch connected fluid passage intermediate said source fluid passage and said snap action device such that triggering of the snap action switch unblocks said third fluid passage creating a fluid flow therethrough such that the pressure intermediate said restrictions is less than said source pressure.

3. Fluid flow division apparatus as claimed in claim 2 in which the means diverting the regulated fluid flow comprises a pressure responsive valve, one end of said valve in fluid communication with said third fluid passage intermediate said two flow restrictions, the other end of said valve in fluid communication with said first fluid passage such that a pressure intermediate said two restrictions lower than source pressure will cause said pressure responsive valve to divert a portion of the flow from said first passage through said valve into said second fluid passage.

4. Fluid flow division apparatus as claimed in claim 3 in which the means regulating the rate at which fluid flows from the flow diverting means comprises a second pressure responsive valve with a fixed aperture therethrough located intermediate and positioned in a series flow relationship with said flow diverting means and means measuring the discharge rate of said diverted flow such that the magnitude of the diverted flow is limited by said fixed aperture only until a preselected magnitude of diverted flow results in a pressure difference across said discharge flow measuring means sufficient to shift said second pressure responsive valve to permit diverted flow to bypass said fixed aperture and thus increase the discharge rate of said diverted flow.

5. In a turbine engine afterburner control, apparatus comprising in combination, fuel regulation means, fuel flow division means including fuel flow division triggering means responsive to an engine operating parameter receiving regulated fuel flow from said fuel regulation means supplying fuel to separate afterburner sections, two sets of fuel metering and atomization means for receiving fuel from said fuel flow division means, said fuel flow division means comprising a valve responsive to said triggering means and controlling the flow of fuel through one of said sets of fuel metering and atomization means, fuel flow measurement means for measuring the fluid flow through said one set of fuel metering and atomization means, second fuel regulation means responsive to said fluid measurement means further controlling the flow through said one set of fuel metering and atomization means.

6. In a turbine engine afterburner control, apparatus comprising in combination, a conduit adapted to receive a regulated supply of fluid, at least two discharge lines, means connecting one discharge line with said conduit, fluid connecting means connecting another normally empty one of said discharge lines with said conduit, valve means in said fluid connecting means, a flow restriction in said fluid connecting means in flow series connection with said valve means, means for opening said valve means and filling said fluid connecting means through said restriction, and means responsive to a predetermined flow through said another discharge line and after said line has been filled removing said restriction.

7. A turbine engine afterburner fuel control flow divider comprising in combination a source of regulated fluid flow, first and second principal passages for conducting fluid, said first principal passage in communication with said source, a pressure responsive valve for diverting flow from said first principal passage to said second principal passage, a first auxiliary passage in fluid communication with said first principal passage at one end, a two position snap acting flow control valve at the other end of said first auxiliary passage, two spaced apart flow restrictions positioned within said first auxiliary passage, a snap action flow control switch actuated by an engine parameter indicative signal whereby at one switch position said snap acting valve is caused to open permitting flow through said first auxiliary passage with a resulting pressure intermediate said two flow restrictions lower than said source pressure and in the other switch position said valve is caused to block the flow through said first auxiliary passage with a resultant pressure intermediate said two restrictions equal to source pressure, a second auxiliary passage in communication with pressure intermediate said two restrictions in said first auxiliary passage and also in communication with said diverting valve whereby said diverting valve permits flow to enter the second principal passage in response to lower than source pressure intermediate said restrictions, a second pressure responsive valve located in said second principal passage and positioned in series flow relationship intermediate said first pressure responsive valve and the discharge port of said second passage said second valve having a fixed aperture therethrough, flow measurement means to produce a signal proportional to a sensed pressure drop across said second principal passage discharge port and communicate said signal to said second pressure responsive valve causing a shifting thereof to permit flow to bypass the fixed aperture enroute to said discharge port upon reaching a preselected discharge flow rate.

References Cited by the Examiner

UNITED STATES PATENTS

| | | | |
|---|---|---|---|
| 2,282,755 | 5/1942 | Bondurant et al. | 236—81 |
| 2,627,703 | 2/1953 | Spencer | 137—501 X |
| 2,969,109 | 1/1961 | Card | 158—36 |
| 2,980,176 | 4/1961 | Torell | 158—36.4 |
| 2,988,875 | 6/1961 | Farkas | 60—35.6 |
| 3,037,552 | 4/1962 | Foulon | 158—36 |
| 3,197,958 | 8/1965 | Davies | 158—36 |

FOREIGN PATENTS 811,501  1/1937  France.

FREDERICK KETTERER, *Primary Examiner.*